United States Patent
Robinson, Jr.

(10) Patent No.: US 12,209,755 B2
(45) Date of Patent: Jan. 28, 2025

(54) SYSTEM AND METHOD FOR CONTROLLING SMOKE DURING AIR FRYING IN A RANGE OR OVEN

(71) Applicant: Catalytic Combustion Corporation, Bloomer, WI (US)

(72) Inventor: John W. Robinson, Jr., Bloomer, WI (US)

(73) Assignee: Catalytic Combustion Corporation, Bloomer, WI (US)

( * ) Notice: Subject to any disclaimer, the term of this patent is extended or adjusted under 35 U.S.C. 154(b) by 423 days.

(21) Appl. No.: 17/563,519

(22) Filed: Dec. 28, 2021

(65) Prior Publication Data

US 2022/0205644 A1 Jun. 30, 2022

Related U.S. Application Data

(60) Provisional application No. 63/131,061, filed on Dec. 28, 2020.

(51) Int. Cl.

| | | |
|---|---|---|
| *F24C 15/20* | (2006.01) | |
| *B01D 53/86* | (2006.01) | |
| *B01D 53/88* | (2006.01) | |
| *B01J 21/04* | (2006.01) | |
| *B01J 23/42* | (2006.01) | |
| *B01J 35/00* | (2024.01) | |
| *B01J 35/40* | (2024.01) | |
| *B01J 35/56* | (2024.01) | |

(52) U.S. Cl.
CPC ...... *F24C 15/2014* (2013.01); *B01D 53/8687* (2013.01); *B01D 53/885* (2013.01); *B01J 21/04* (2013.01); *B01J 23/42* (2013.01); *B01J 35/19* (2024.01); *B01J 35/40* (2024.01); *B01J 35/56* (2024.01); *B01D 2255/1021* (2013.01); *B01D 2255/2092* (2013.01); *B01D 2255/9022* (2013.01); *B01D 2255/904* (2013.01); *B01D 2257/708* (2013.01)

(58) Field of Classification Search
CPC .................................................... F24C 15/2014
USPC .......................................................... 126/19 R
See application file for complete search history.

(56) References Cited

U.S. PATENT DOCUMENTS

| | | | | |
|---|---|---|---|---|
| 5,622,100 | A * | 4/1997 | King | A47J 37/1271 422/177 |
| 6,270,336 | B1 * | 8/2001 | Terashima | F23C 6/04 431/11 |
| 2002/0059930 | A1 | 5/2002 | Schmidmayer et al. | |
| 2009/0050129 | A1 * | 2/2009 | Robinson, Jr. | F24C 15/2014 422/173 |

\* cited by examiner

*Primary Examiner* — Vivek K Shirsat
(74) *Attorney, Agent, or Firm* — GableGotwals

(57) ABSTRACT

An oven of this disclosure includes a heated catalyst assembly that reduces emissions during cooking cycles and, in particular, during air frying. The heated catalyst assembly resides between the cooking chamber and its exhaust vent and includes a thermal radiation source including at least one looped element, a first catalyst located toward the inlet in proximity to one side of the thermal radiation source and a second catalyst located in proximity to an opposite side of the thermal radiation heat source. The first and second catalysts are arranged in planes parallel to that of the thermal radiation heat source. The heated catalyst assembly reduces emissions of volatile organics to no greater than 6 ppm.

32 Claims, 16 Drawing Sheets

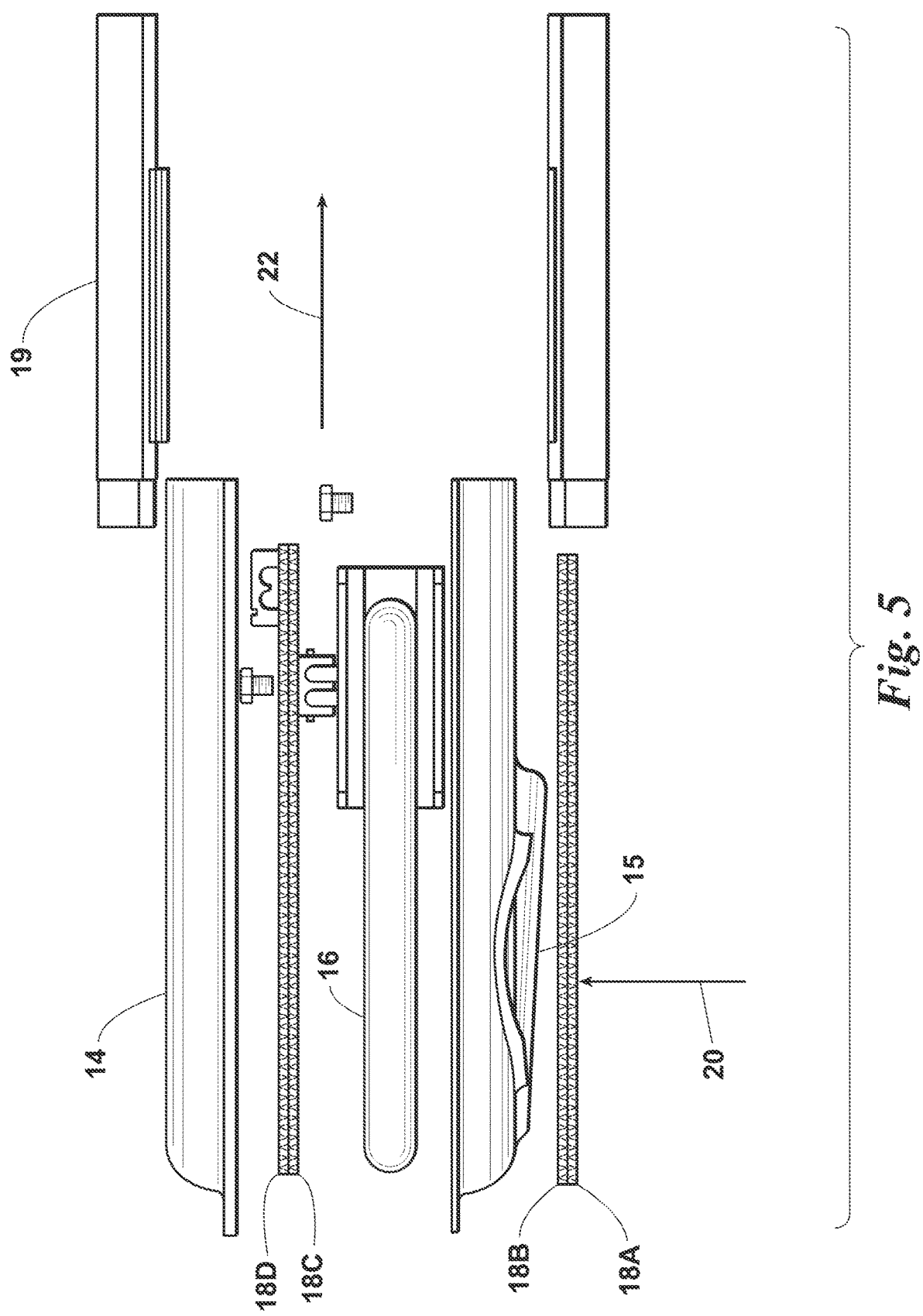

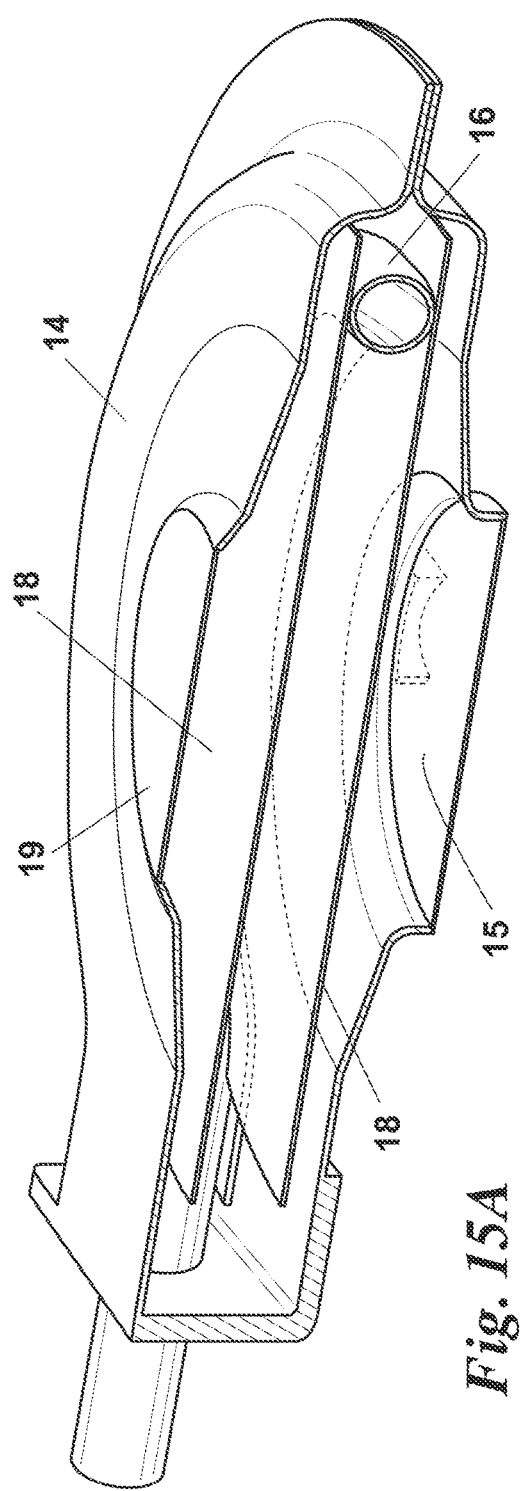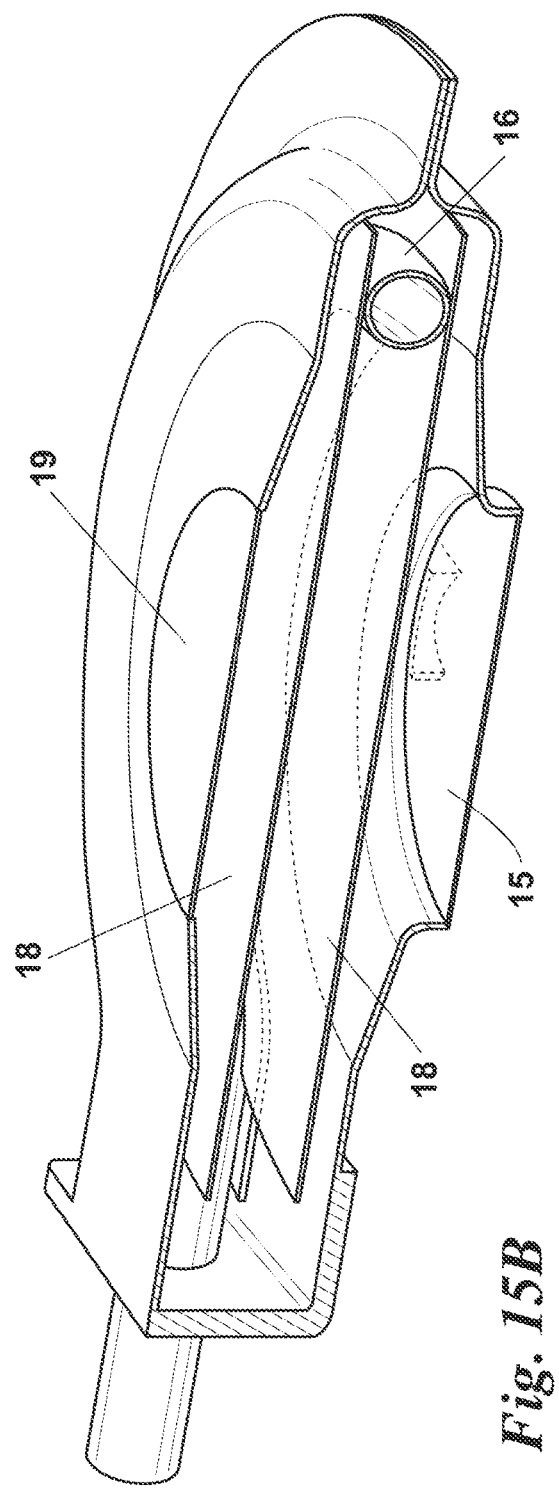

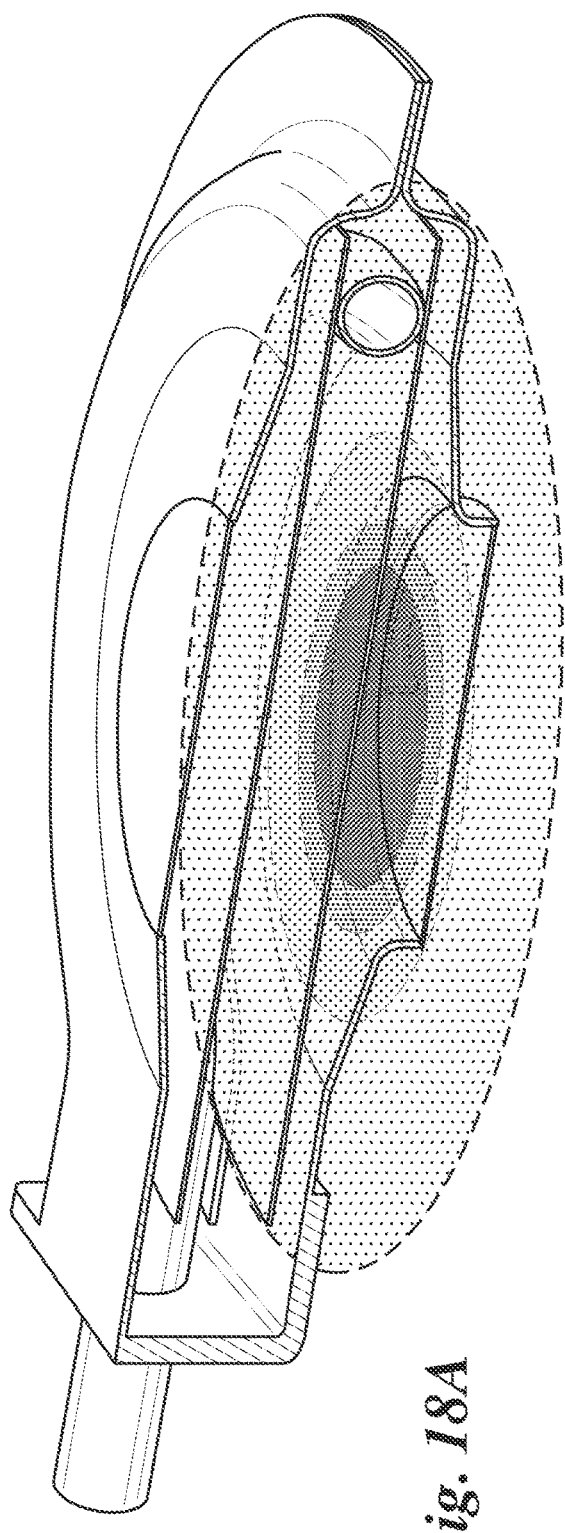
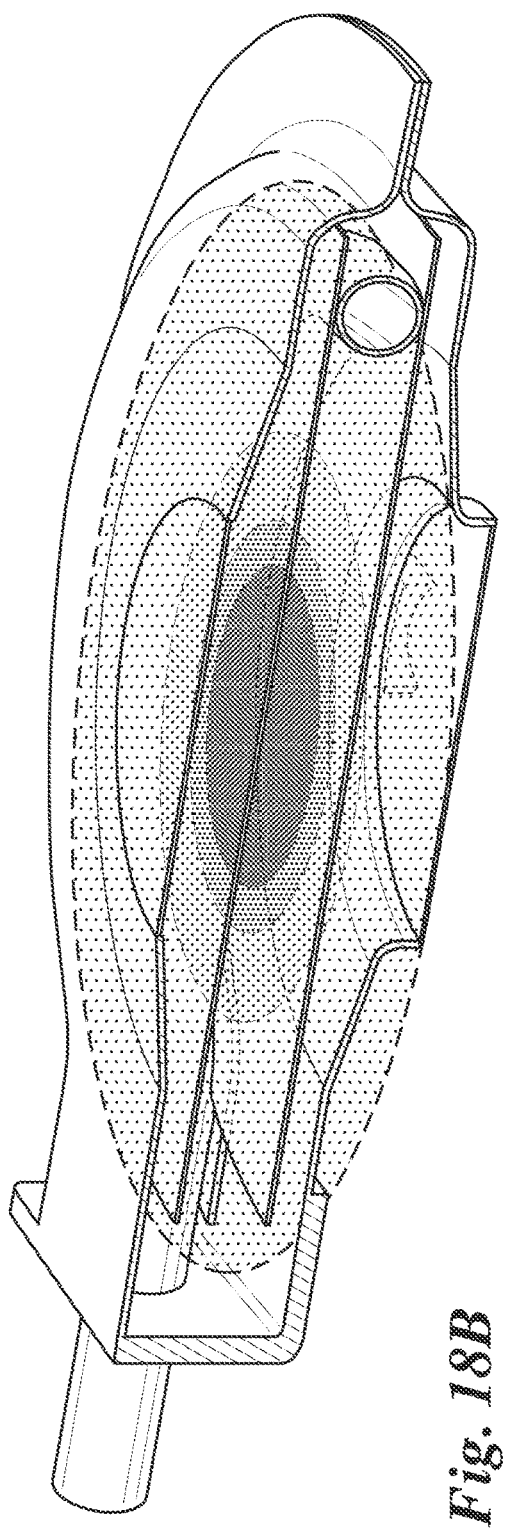
Fig. 18A
Fig. 18B

SYSTEM AND METHOD FOR CONTROLLING SMOKE DURING AIR FRYING IN A RANGE OR OVEN

CROSS-REFERENCE TO CO-PENDING APPLICATIONS

This application claims priority to U.S. Ser. No. 63/131,061 filed Dec. 28, 2020, the subject matter of which is incorporated by reference herein.

BACKGROUND

This disclosure is in the field of appliances used for cooking and, in particular, catalytic devices used in connection with a range or oven to control odors and smoke.

Residential appliance manufacturers have recently introduced oven models that incorporate cooking techniques that utilize rapid recirculation of hot air in the oven cavity to "fry" foods in a manner that is perceived to be healthier than conventional deep fat frying.

These cooking techniques can generate large quantities of smoke that are emitted from the oven vent or can leak through various pathways in the oven cavity. These smoke emissions are viewed as a negative experience by the users and as a result the appliance manufacturers have received many complaints and disgruntled users have posted videos and comments on social media sites.

U.S. Pat. No. 8,418,684 B2 to Robinson, Jr. ("the '684 patent") reviews prior art for a catalytic converter unit for use in combination with an oven for treating odiferous emissions emanating from an oven cavity of a residential range or oven during cooking. The '684 patent discloses a system and method that include a housing that contains an electric heating element and a catalyst unit. The housing may connect to other components of the range or oven to complete the venting of the exhaust from the range or oven. The electric heating element is arranged so that infrared radiation from the hot surface of the element is visible by the inlet face of the catalyst. The power output of the heater is sized so that the catalyst reaches a minimum operating temperature to initiate the catalytic reaction in advance of the temperature increase in the air coming from the cavity. The system and method destroy the odors that come from the cooking process so as to improve the cooking experience. The subject matter of the '684 patent is incorporated by reference herein.

Different cooking cycles within the oven cavity create air flows and air flow temperatures and, therefore different emissions and different rates of emissions. The catalytic conversion unit of the '684 patent is intended for a cooking cycle like baking, where there is a natural draft air flow. For example, in a cooking cycle like baking a fan typically draws air from the middle of the cooking chamber and circulates it around the cooking chamber, the heated air flowing around the food item being cooked. However, in a cooking cycle like air frying, an active air flow is used, in which the fan reverses direction, blowing air into the middle of the cooking chamber with the heated air flowing directly to the food item. Because the air is nearer to the heating elements when blown, the air contacting the food item is at a higher temperature during air frying than it would be during baking. Air frying causes aerosolized grease droplets in certain foods that can cause smoking.

BRIEF DESCRIPTION OF THE DRAWINGS

FIG. 5 is a front elevation, exploded assembly view of the catalytic system of FIG. 1.

FIG. 15A is an embodiment of a minimum diameter exhaust port used in an embodiment of a residential range or oven configured with an air frying mode. The exhaust port may be the same size diameter as the inlet port or may be a different size diameter. In embodiments, the exhaust port may be a 7 mm diameter exhaust port.

FIG. 15B is an embodiment of a maximum diameter exhaust port used in an embodiment of a residential range or oven configured with an air frying mode. Again, the exhaust port may be the same size diameter as the inlet port or may be a different size diameter. In embodiments, the exhaust port may be a 36-¾ mm diameter exhaust port.

FIG. 18A is first layer mesh screen velocity profile for the maximum diameter exhaust port of FIG. 15B. This profile differs from that of the minimum diameter exhaust port, the velocity being less than the minimum diameter exhaust port. In embodiments, velocity ranges from about 0.86 feet per second concentric with the exhaust port (about 0.26 meters per second) and decreases toward the periphery to about 2.66e–06 feet per second (about 0.81e–06 meters per second).

FIG. 18B is a second layer mesh screen velocity profile for the maximum diameter exhaust port of FIG. 15B. The velocity is in a same or similar range to that of the first layer mesh screen.

ELEMENTS USED IN THE DRAWINGS

Figure 1:
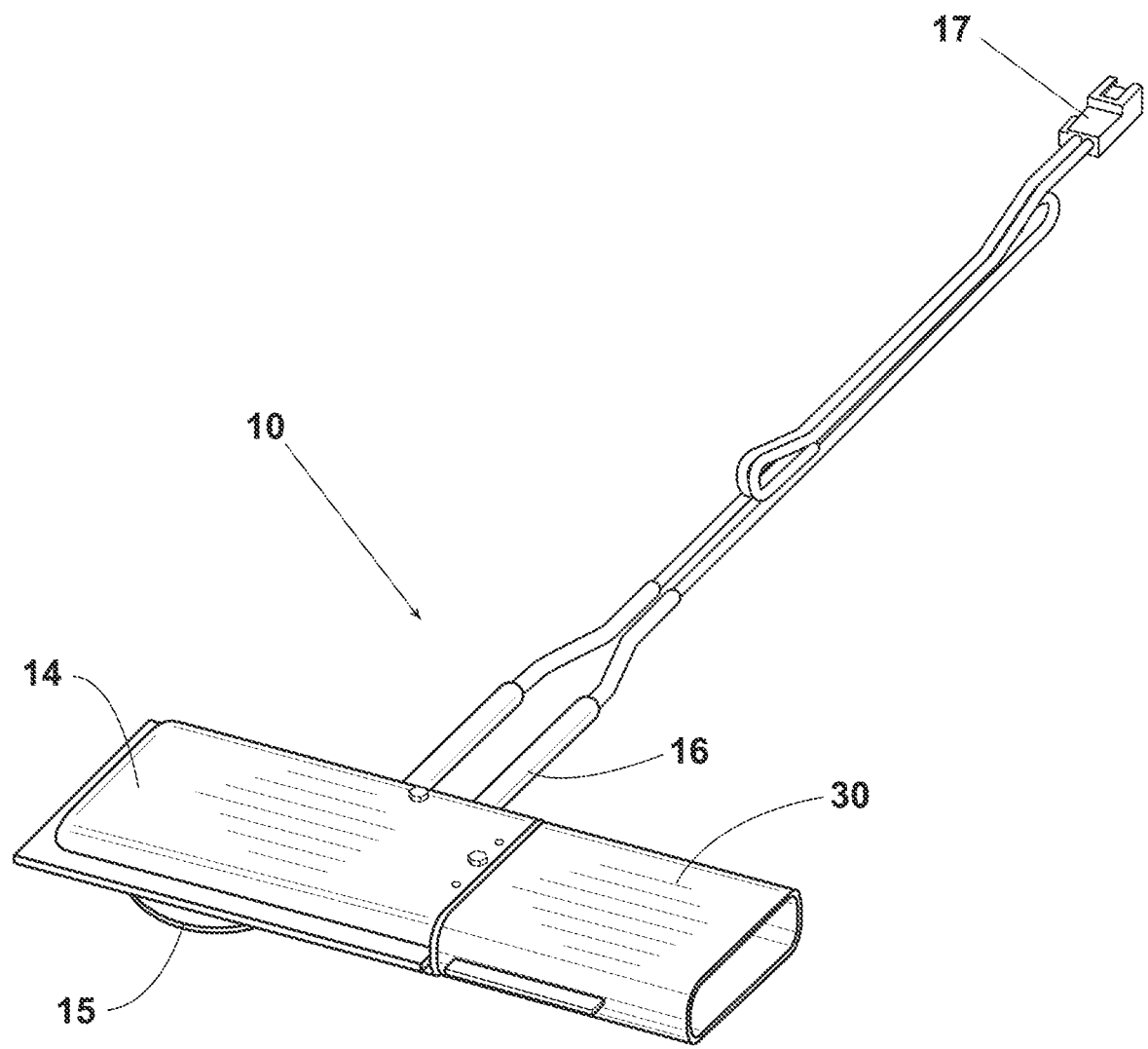
FIG. 1 is an isometric view of an example embodiment of a catalytic system of this disclosure.
Figure 2:
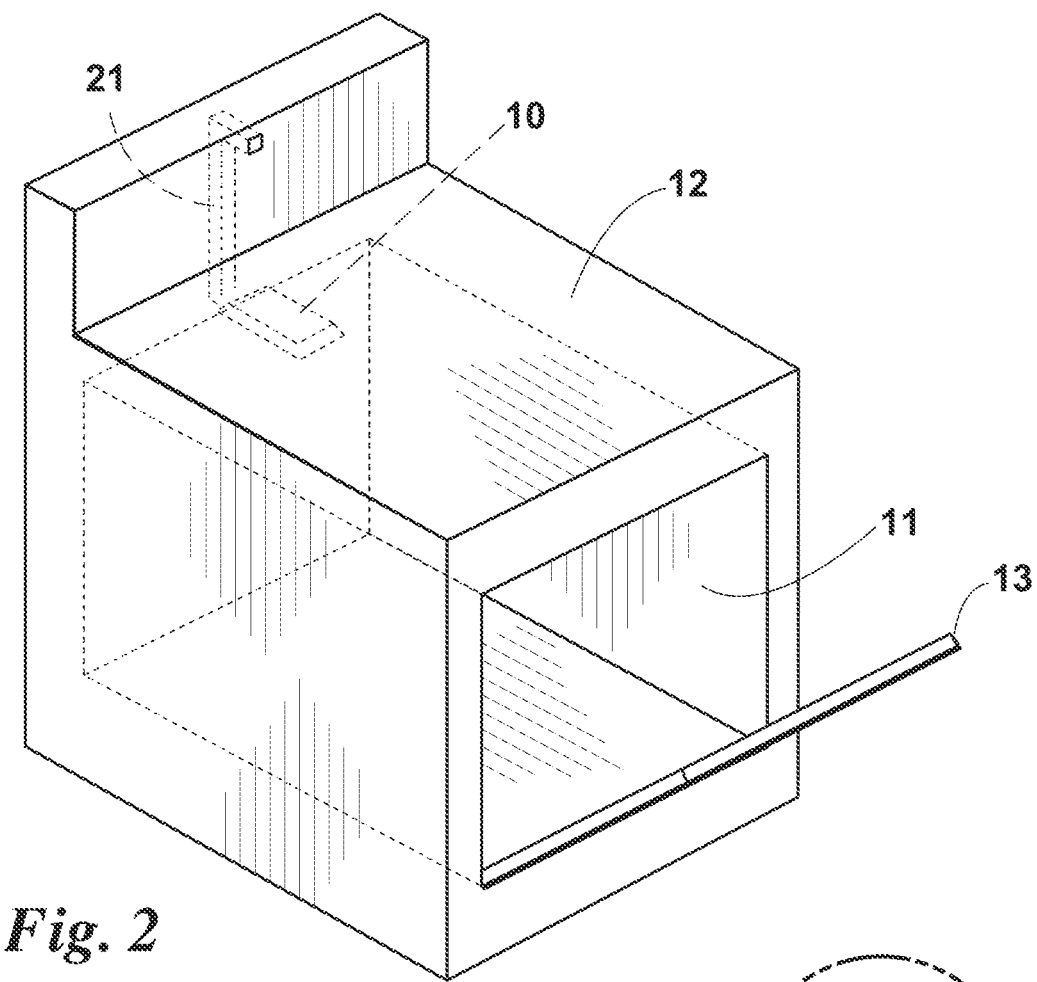
FIG. 2 is a top perspective schematic type depiction of a generic residential range or oven showing the catalytic conversion unit in assembled relation with the oven or range.
Figure 3:
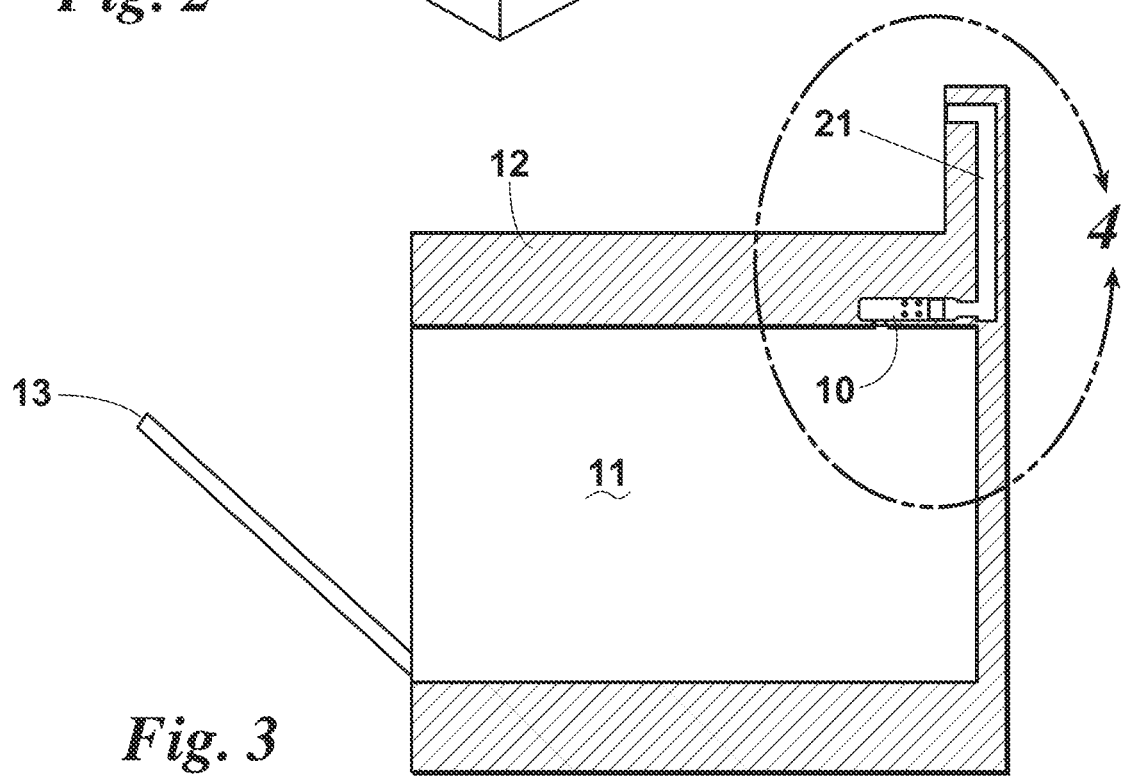
FIG. 3 is a cross-sectional side view of the range or oven of FIG. 2 outfitted with the catalytic conversion unit of the present invention.
Figure 4:
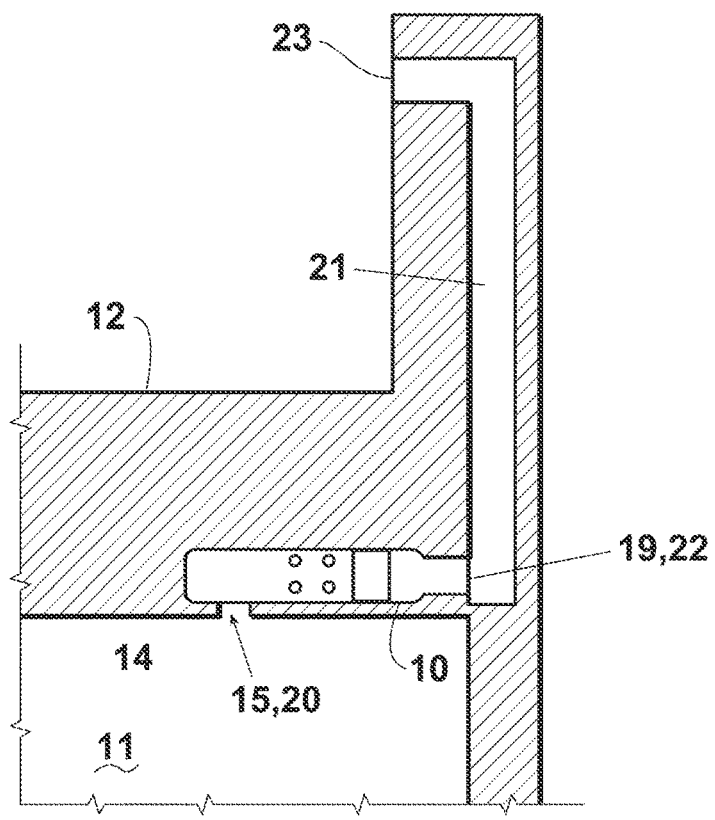
FIG. 4 is an enlarged, upper right section of the range or oven of FIG. 3, showing the structures defining an emission pathway.
Figure 17C:
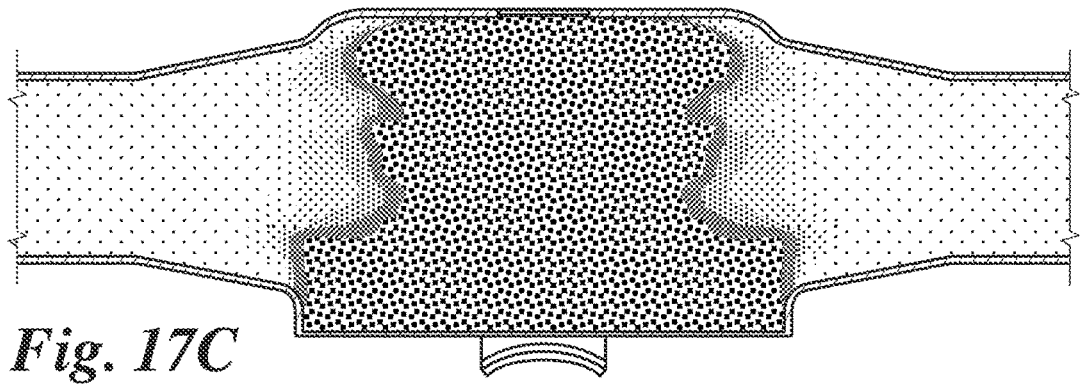
FIG. 17C is a side elevation view of the velocity profile through the first and second layers for the minimum diameter exhaust port of FIG. 15A. This profile differs from that of the In embodiments, velocity ranges from about 1 foot per second concentric with the exhaust port (about 0.3 meters per second) and decreases toward the periphery to about 1.33e–05 feet per second (about 0.4e–05 meters per second).
Figure 18C:
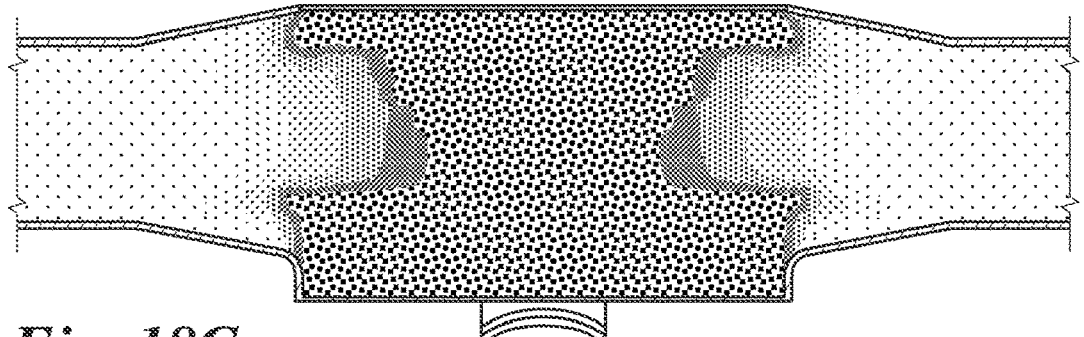
FIG. 18C is a side elevation view of the velocity profile through the first and second layers for the maximum diameter exhaust port of FIG. 15B.
Figure 6:
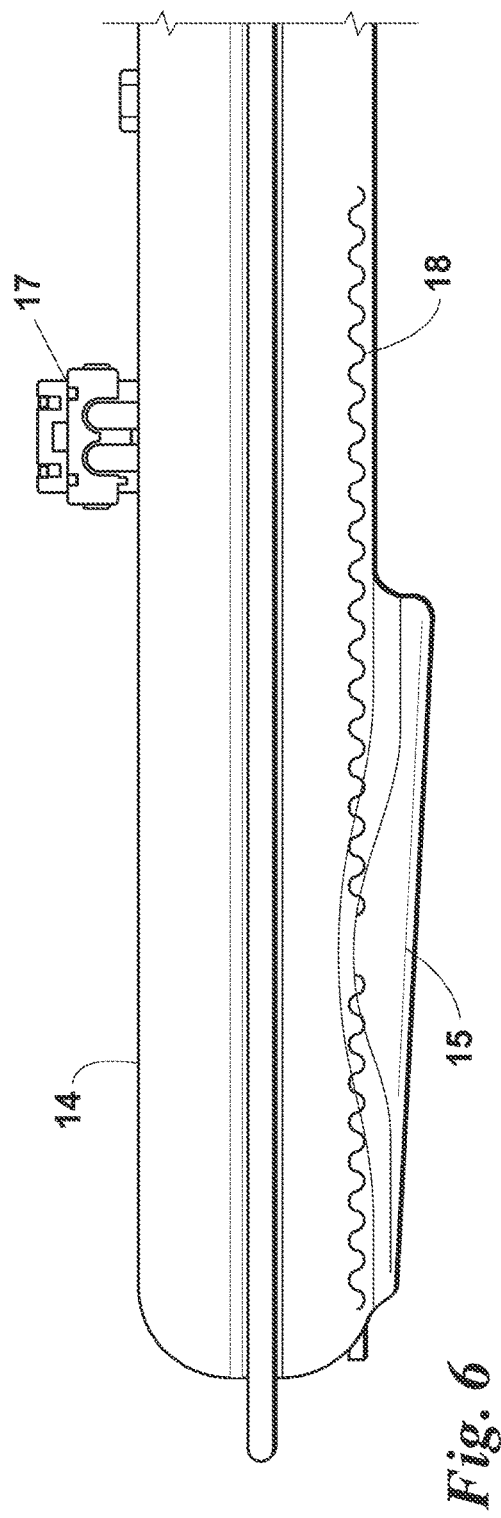
FIG. 6 is a partial, front elevation view of the left hand side of the catalytic system of FIG. 1.
Figure 8:
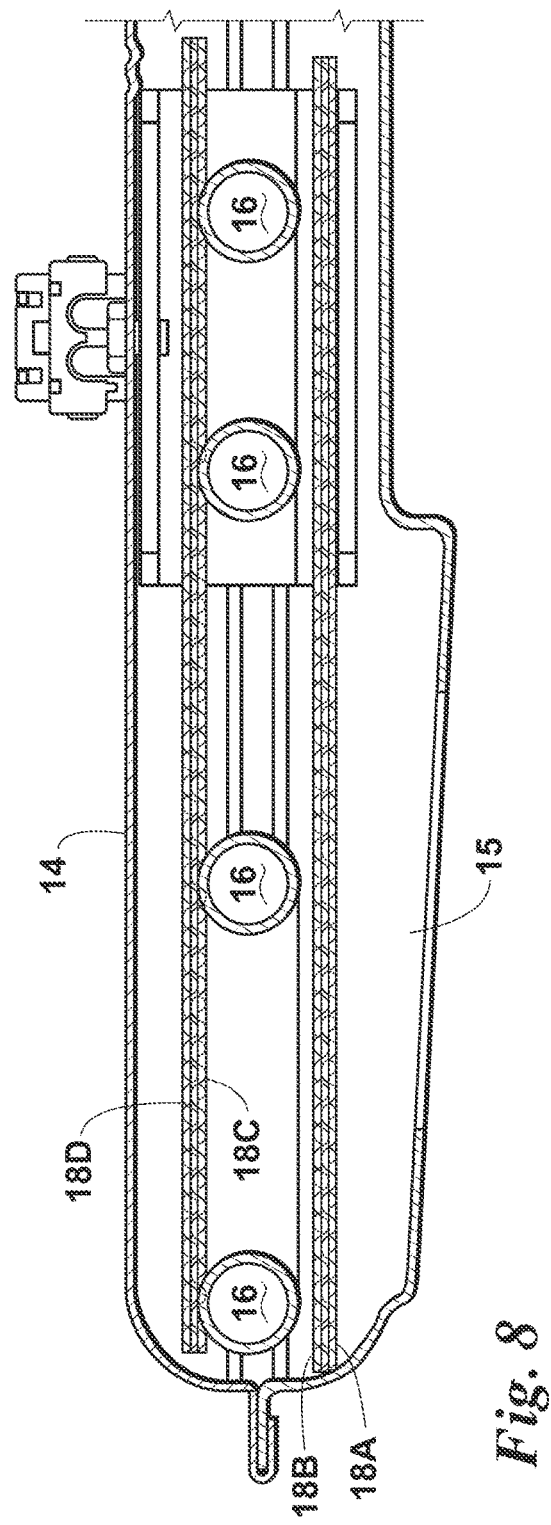
FIG. 8 is a cross-section, front elevation view of the left hand side of the catalytic system of FIG. 1.
Figure 7:
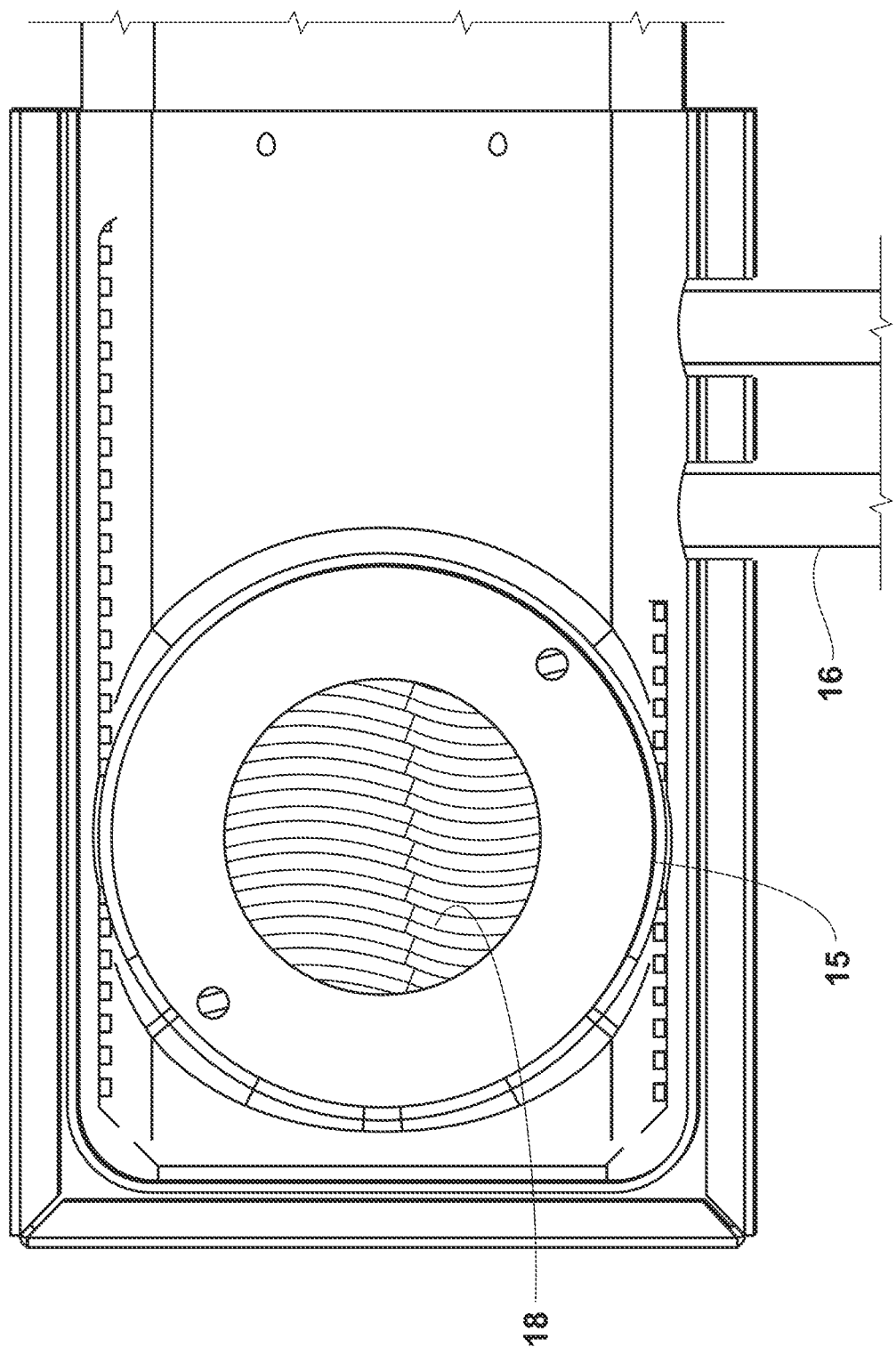
FIG. 7 is a bottom view of the left hand side of the catalytic system of FIG. 1.
Figure 9:
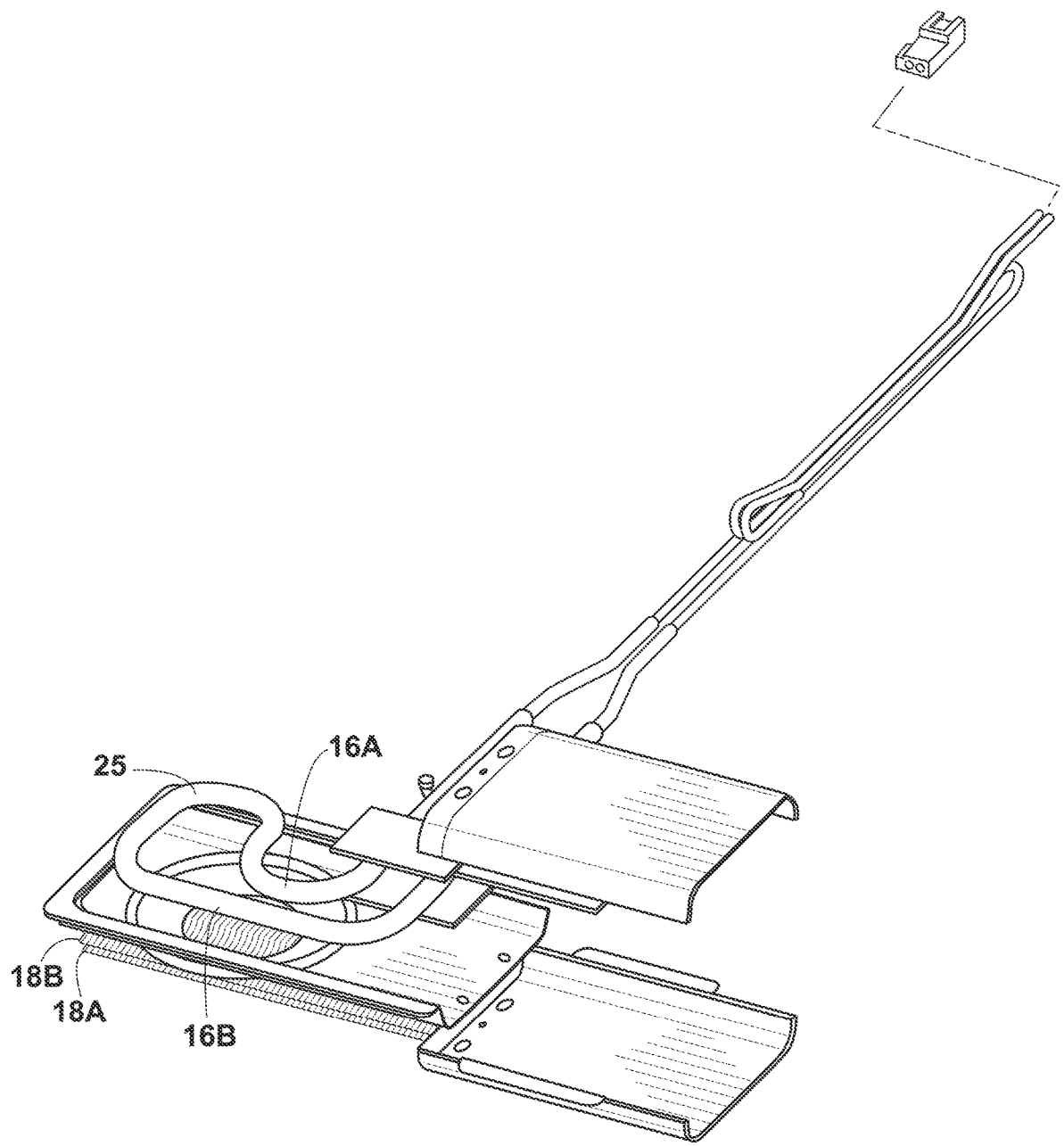
FIG. 9 is a top perspective, exploded assembly view of the catalytic system of FIG. 1 with the upper catalytic screens removed.

10 Heated screen catalyst assembly
11 Cooking chamber
12 Residential range or oven with air frying mode
13 Range or oven door
14 Housing
15 Inlet to heated screen catalyst assembly
16 Thermal radiation source
17 Circuitry for connection to power source
18 Screen catalyst
19 Outlet from heated screen catalyst assembly
20 Untreated emissions
21 Emission path
22 Treated emissions
23 Outlet
25 Looped members of thermal radiation source
30 Vent tube

DETAILED DESCRIPTION

Referring first to FIGS. 1 to 9, embodiments of a heated screen catalyst assembly 10 of this disclosure is configured for use with a residential range or oven 12 that includes an air frying mode. The assembly 10 may be housed within the oven 12, with its inlet 15 exposed to the cooking chamber 11 of the oven 12. A housing 14 contains the assembly 10 and connects either directly or through the use of ancillary components to the cooking chamber 11 and to an outlet 23 of the oven 12. This provides a path for emissions during cooking or air frying from the chamber 11 to the outlet 23. Contained in the housing are an electric heating element or thermal radiation source 16 and a catalyst screen 18.

In embodiments, the catalyst screen 18 is in the form of a wire mesh cloth located on opposite sides of the radiation source 16. The one catalyst screen 18 is located closer to the inlet 15. The radiation source 16 heats the air entering the inlet 15 as well as the screen 18. This first screen 18 may be slightly hotter, at least initially, than the second screen 18, but the radiation source 16 tends to equilibrate the two screens 18. The screens 18 may also be hotter than the oven cavity depending on what is programmed for the cook cycle, which may be an air-frying cook cycle. By way of a non-limiting example, the catalyst screen 18 may be in a range of 600° F. to 650° F., the oven cavity being in a range of 400° F. to 425° F.

Figure 16A:
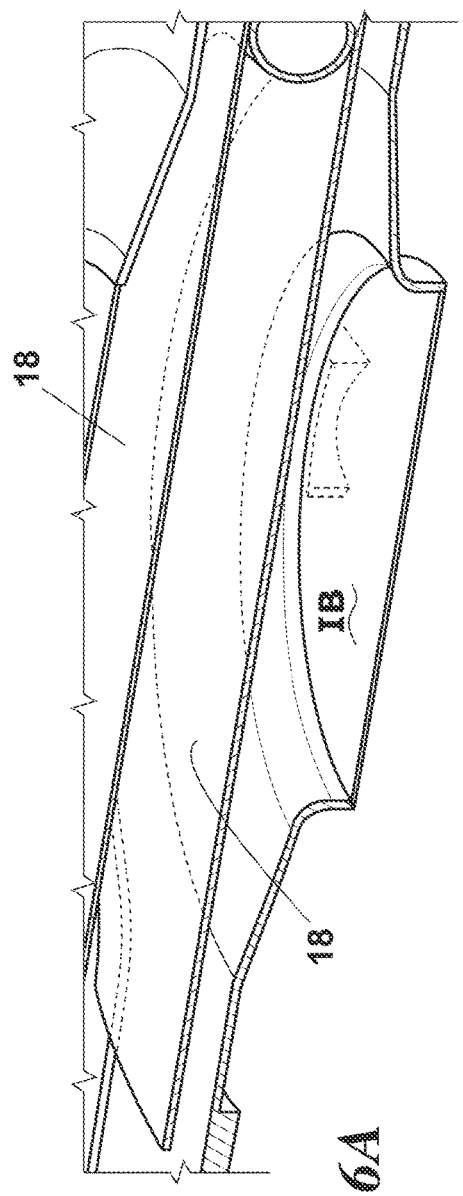
FIG. 16A illustrates the location of the inlet boundary condition ("IB") for the exhaust through the ports of FIGS. 15A & 15B. In embodiments, the inlet volume flow may be about 0.83 cubic feet per min (about 23.5 liters per min).
Figure 16B:
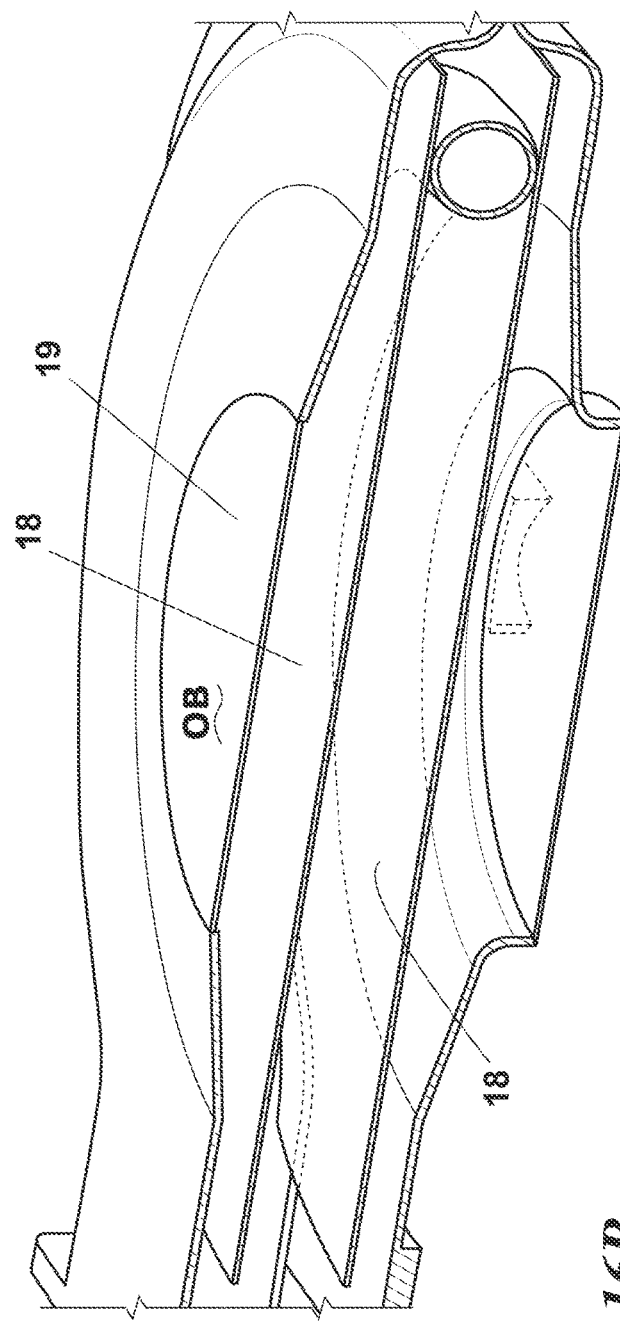
FIG. 16B illustrates the location of the outlet boundary condition ("OB") for the exhaust through the ports of FIGS. 15A & 15B. The environment pressure may be about 406.7 in $H_2O$ (WC) or about 14.7 psi or 1 bar.
Figure 17A:
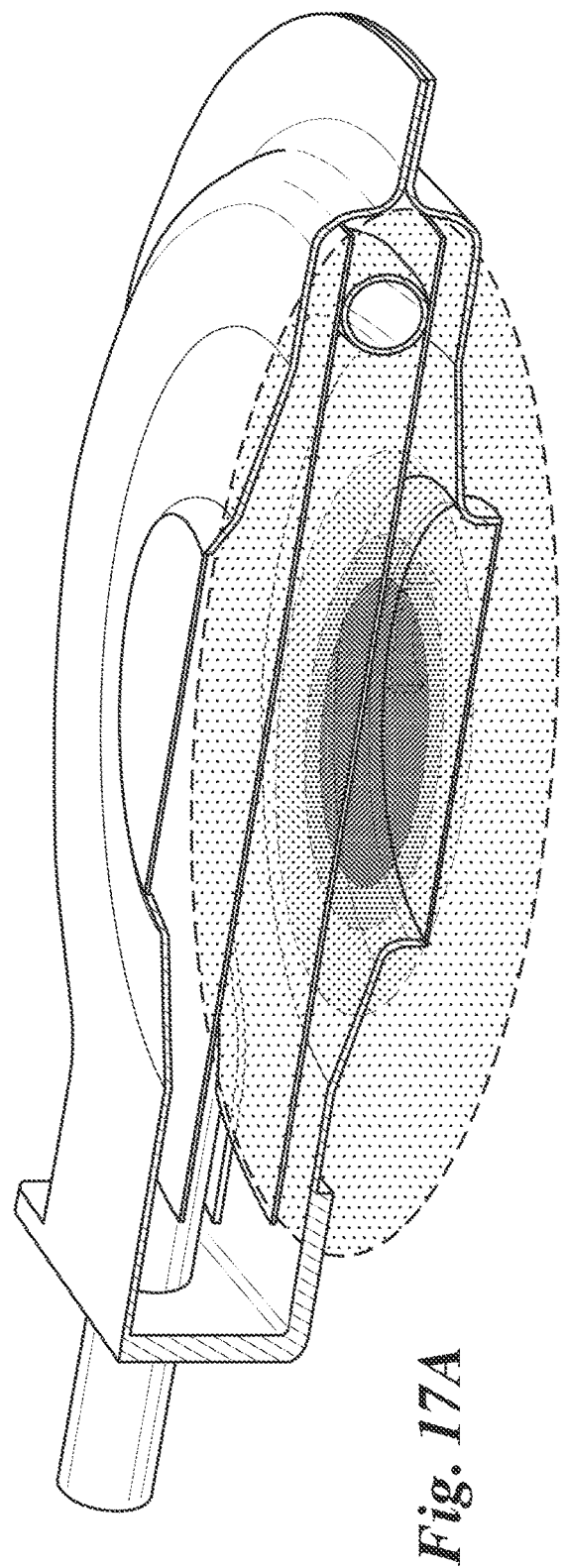
FIG. 17A is first layer mesh screen velocity profile for the minimum diameter exhaust port of FIG. 15A. In embodiments, velocity ranges from about 1 cubic foot per second at concentric with the exhaust port and decreases toward the periphery to about 1.33e−05.
Figure 17B:
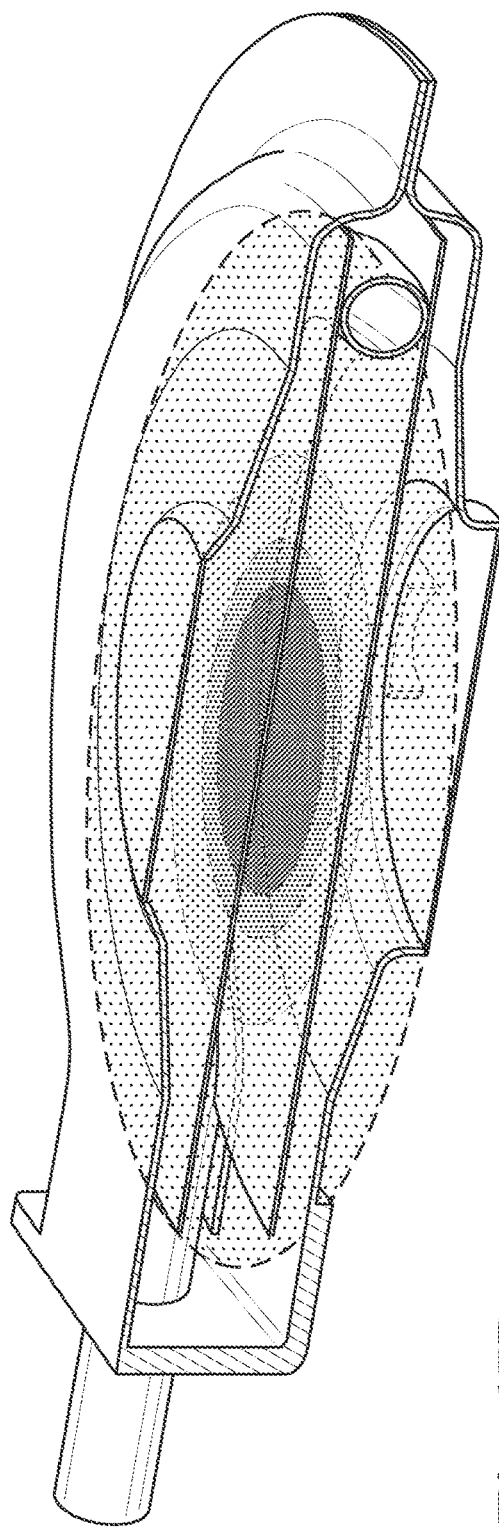
FIG. 17B is a second layer mesh screen velocity profile for the minimum diameter exhaust port of FIG. 15A. The velocity is in a same or similar range to that of the first layer mesh screen.

The first screen 18 may be more surface heat reactive than the second screen 18, which receives air that has passed through the first screen 18 as well as the radiation source 16. The air may be at its maximum temperature at the second screen 18. See e.g. FIG. 16A ff. Unlike the '684 patent, the degree of control needed in the heated screen catalyst assembly 10 is not as stringent a requirement. The catalyst screen 18 in close proximity to the radiation source 16 superheats the screen 18 at a much higher temperature than air temperature flowing throughout.

Emissions during cooking or air frying follow an emissions path 21 in which the emissions enter the inlet 15 of assembly 10 as untreated emissions 20, pass through the catalyst screen 10, and exit the outlet 19 of the assembly 10 as treated emissions 22 which are then exhausted or vented through an outlet 23 of the oven 11. In embodiments, the inlet 15 and outlet 19 of the assembly housing 14 are coaxially aligned with one another, with the screen catalysts 18 overlapping the inlet 15 and outlet 19. See e.g. FIGS. 15A & 15B.

In embodiments, catalyst element 18 is a screen catalyst. The screen catalyst may include a wire mesh cloth having a high surface area aluminum oxide coating that has been impregnated with catalytically active elements. Other substrate formats such as expanded metal or metal foil or ceramics could be used. The catalytically active elements may be a platinum only element. In other embodiments, it may be a platinum and palladium blend (although platinum only performed better during air frying). The coating may be a mixture of two aluminum oxide phases, such as the gamma and boehmite phases. Other elemental oxides may be present in lesser amounts to act as thermal stabilizers or to enhance the effectiveness of the catalytically active elements. The oxides are prepared and applied in a manner well known to those skilled in the art.

The mesh size of the screen catalyst should be selected to provide sufficient heat reactive surface area without causing excessive pressure drop. In embodiments, the screen catalyst may in a range of a size 10 mesh wire cloth to a size 50 mesh wire cloth, there being discrete values and subranges within this broader range. In some embodiments, a size 30 mesh wire cloth was used. The mesh size should also be selected so that the oven can pass fire and explosion tests like those performed by Underwriters Laboratories (restriction to flow in the vent 23 can blow door 13 open during a fire or other extreme temperature event). In tests, the 30 mesh wire cloth provided good balance between reactive surface pressure and pressure drop.

To maintain a consistent operating or catalytic temperature, a catalytic conversion unit of this disclosure includes a thermal radiation source 16. The heated screen catalyst assembly 10 depends upon the source 16 for a consistent operative temperature of its catalytic elements 18, making the heated screen catalyst assembly 10 unaffected by temperature variations caused by a user opening the door 13 of the cooking chamber 11 during air frying or cooking. In embodiments, thermal radiation source 16 may include one or more looped members 25 being arranged in a same plane as one another. In some embodiments, there are two looped members 25 along one run 16A of source 16 and no looped members along an opposite run 16A of source 16. Adjacent to, spaced apart from, and overlapping the looped members 25 is at least two catalyst mesh or screen catalysts 18 arranged parallel to the looped members 25, each located on opposite sides of the looped members 25. In some embodiments, at least two layers of screen catalysts 18A, 18B are located on one side of the looped members 25 and another at least two layers of screen catalysts 18C, 18D are located on the other side of the looped members 25.

Figure 10:
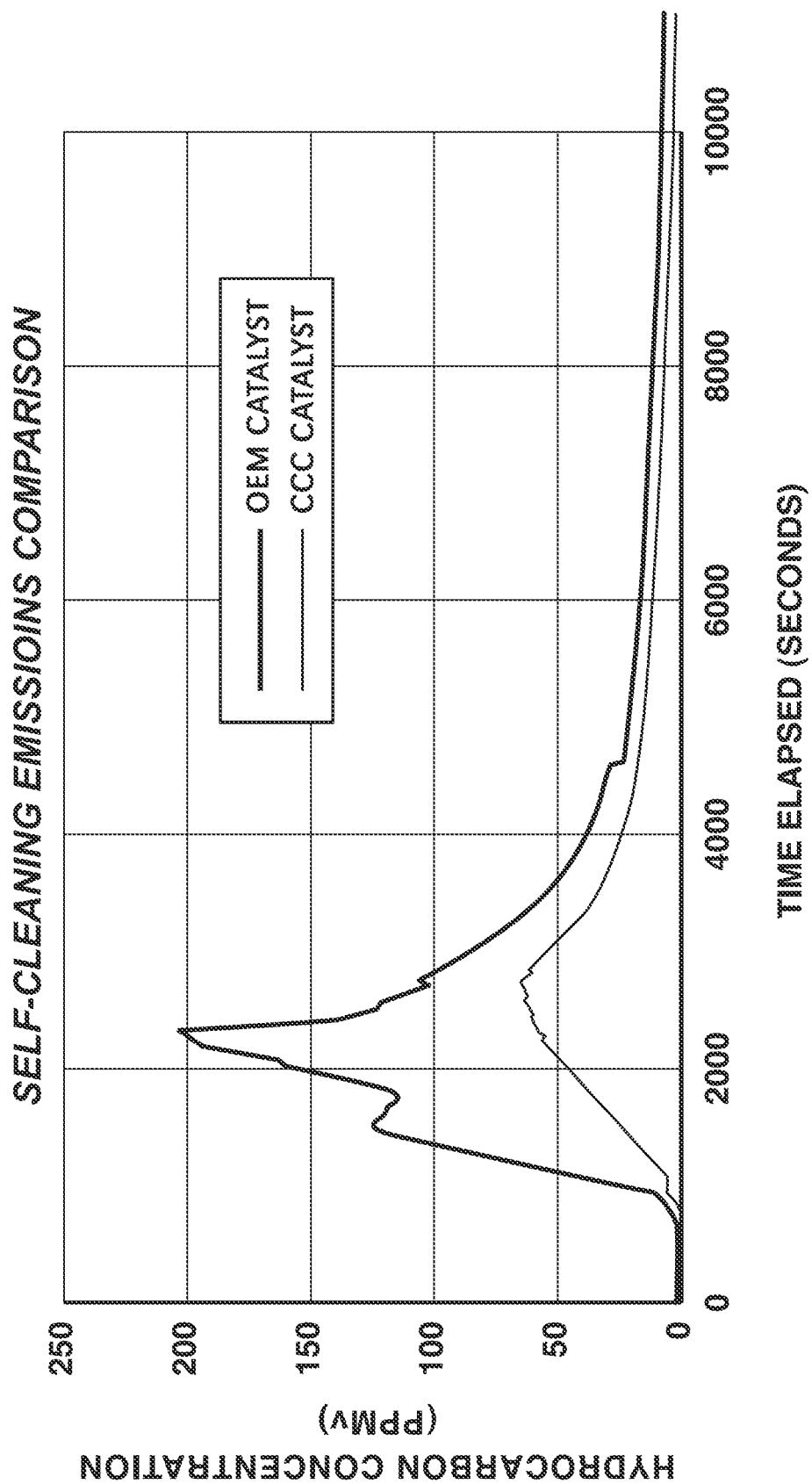
FIG. 10 is a graph comparing emissions during a test of the catalytic system of this disclosure ("CCC Catalyst") during a self-cleaning cycle of the residential range or oven with those of a prior art catalytic system ("OEM Catalyst").

Referring now to FIG. 10, tests of a heated catalyst assembly of this disclosure were performed using ½ cup of an OEM "monster mash" recipe in an Electrolux oven with air frying mode during the oven's self-clean setting over a period of three hours. The catalyst temperature within the heated screen catalyst assembly was 650° F. The prior art ("OEM Catalyst" relied on heat from the oven chamber to initiate the reaction. Due to heat transfer effects, it lagged behind the pyrolysis of the baked on food soil. Since the heater overcomes the heat transfer issues, the screen catalyst 18 activates faster, resulting in far less emissions. The screen catalyst of this disclosure, labeled as the "CCC Catalyst" in the figure, reduced the overall emissions by 54% compared to OEM Catalyst. The OEM Catalyst peaked at 204 PPMv of emissions. The CCC Catalyst peaked at 66 PPMv of emissions.

In other tests of embodiments of this disclosure, bacon was air fried in the Electrolux oven using the following parameters for each test:
   Amount of Bacon: 1 lb per pan
   Number of Cycles: 3
   Oven Temperature: 350° F.
   Cook Time: 20 minutes
   Dwell Time: 5 minutes
   Oven Setting: Air Fry Mode
   CCC Catalyst Temp.: 650° F.

Figure 11:
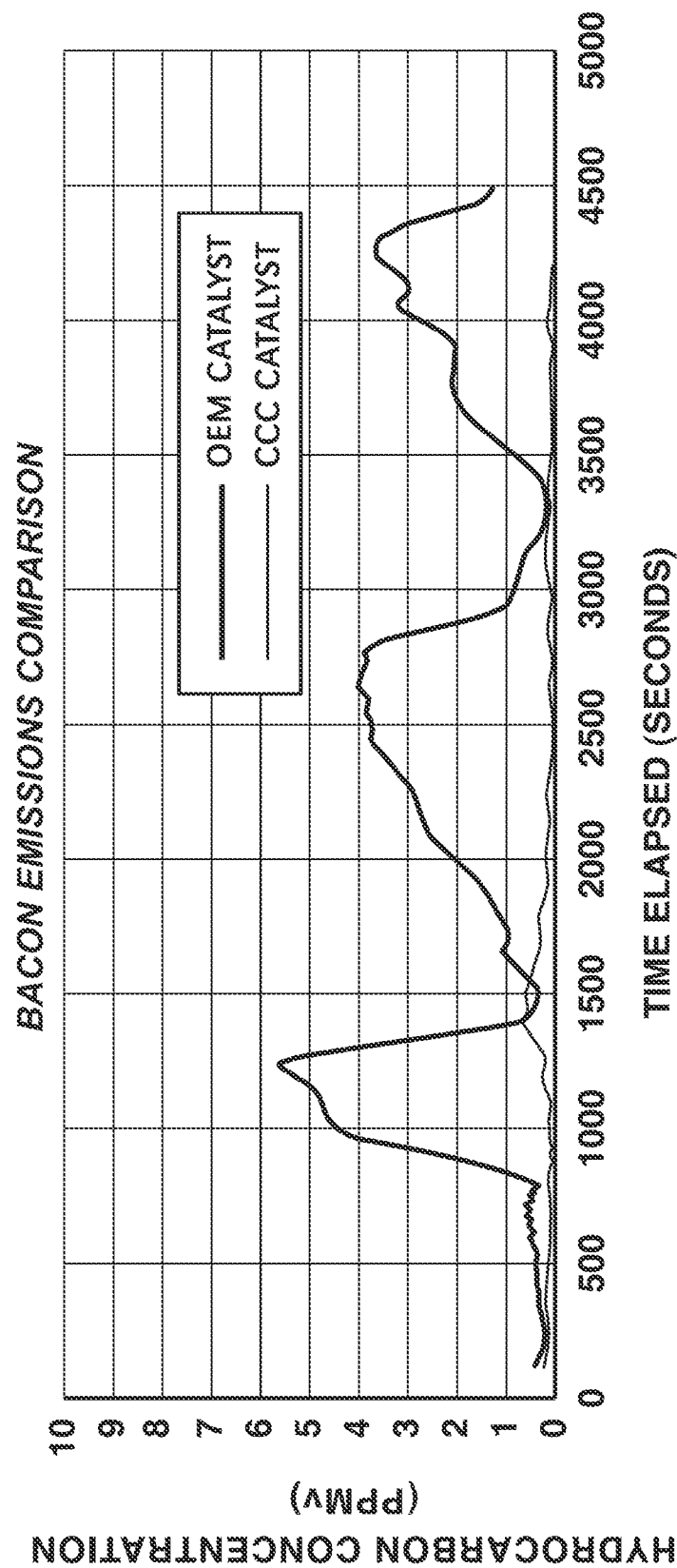
FIG. 11 a graph comparing emissions during a test CCC Catalyst when cooking bacon in the residential range or oven with those of the OEM Catalyst.

The OEM catalyst peaked at just under 6 PPMv for emissions at the largest peak. See FIG. 11. Because air frying bacon in the oven 12 does not lead to complaints of smoking, this implies that achieving fewer than 6 PPMv is "acceptable" for emissions. The CCC Catalyst had 49.4% reduction in emissions compared to the OEM Catalyst with an average of 0.34 PPMv. It was observed that a fair amount of steam came out of the vent 23 during testing of both catalysts.

In other tests of embodiments of this disclosure, a whole turkey test was conducted with the CCC Catalyst installed in the oven 12. A 231b whole turkey was used. The cooking parameters were:
   Oven Temperature: 350° F.
   Cook Time: 4 hours
   Oven Setting: Air Fry Mode
   Catalyst Temperature: 650° F.

Figure 12:
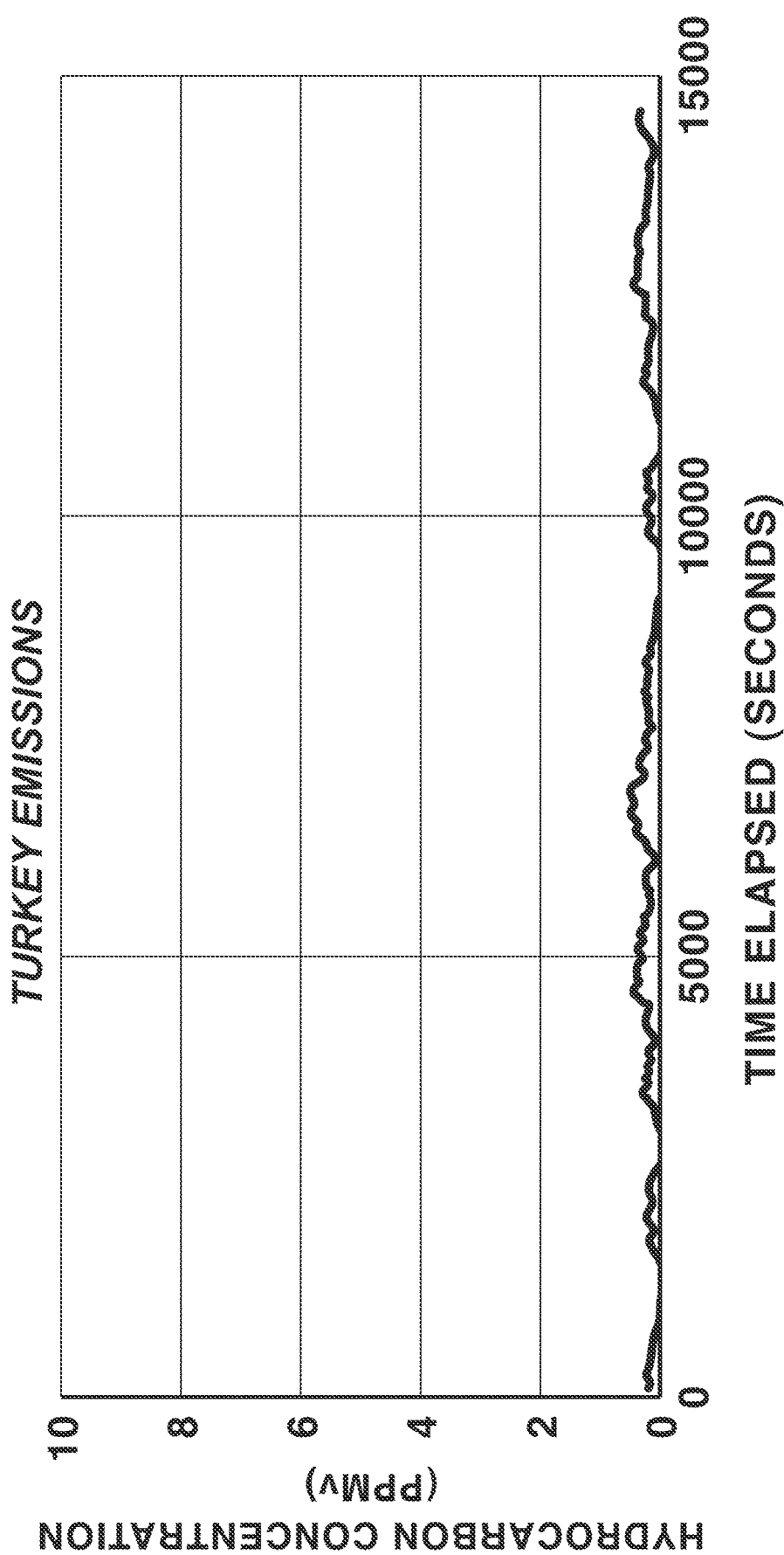
FIG. 12 a graph comparing emissions during a test CCC Catalyst when cooking a turkey in the residential range or oven with those of the OEM Catalyst.

There were practically no emissions and very little steam. See FIG. 12.

In other tests of embodiments of this disclosure, chicken wings were cooked on air fry mode. The cooking parameters used in the tests were as follows:
   Amount of Chicken: 3 lbs per pan
   Number of Cycles: 3
   Oven Temperature: 450° F.
   Cook Time: 35 minutes
   Oven Setting: Air Fry Mode
   CCC Catalyst Temperature: 650° F.
   Dwell Time: 10 minutes (Sequential runs only)

Figure 13:
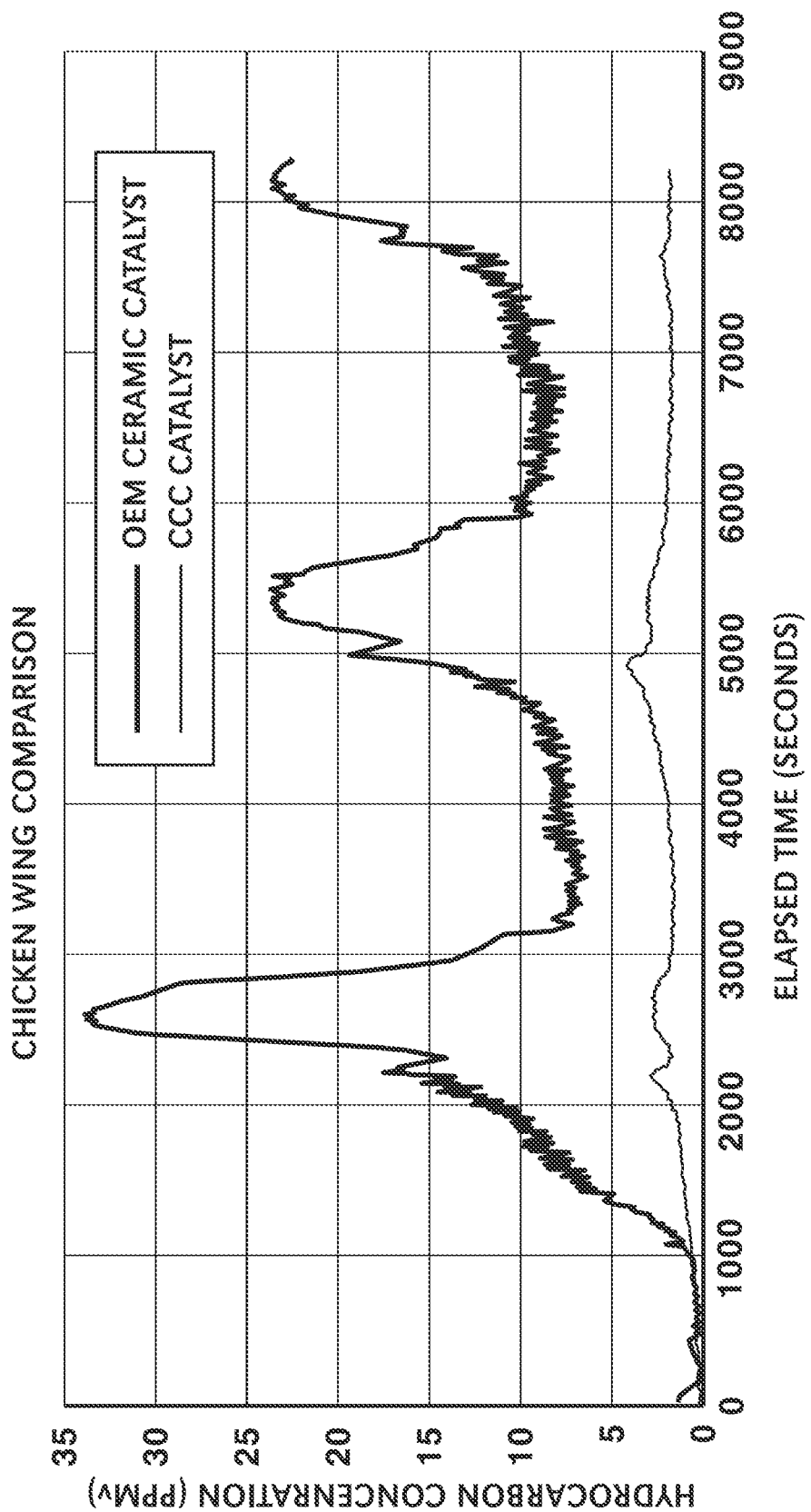
FIG. 13 a graph comparing emissions during a test CCC Catalyst when cooking chicken wings in the residential range or oven with those of the OEM Catalyst.
Figure 14:
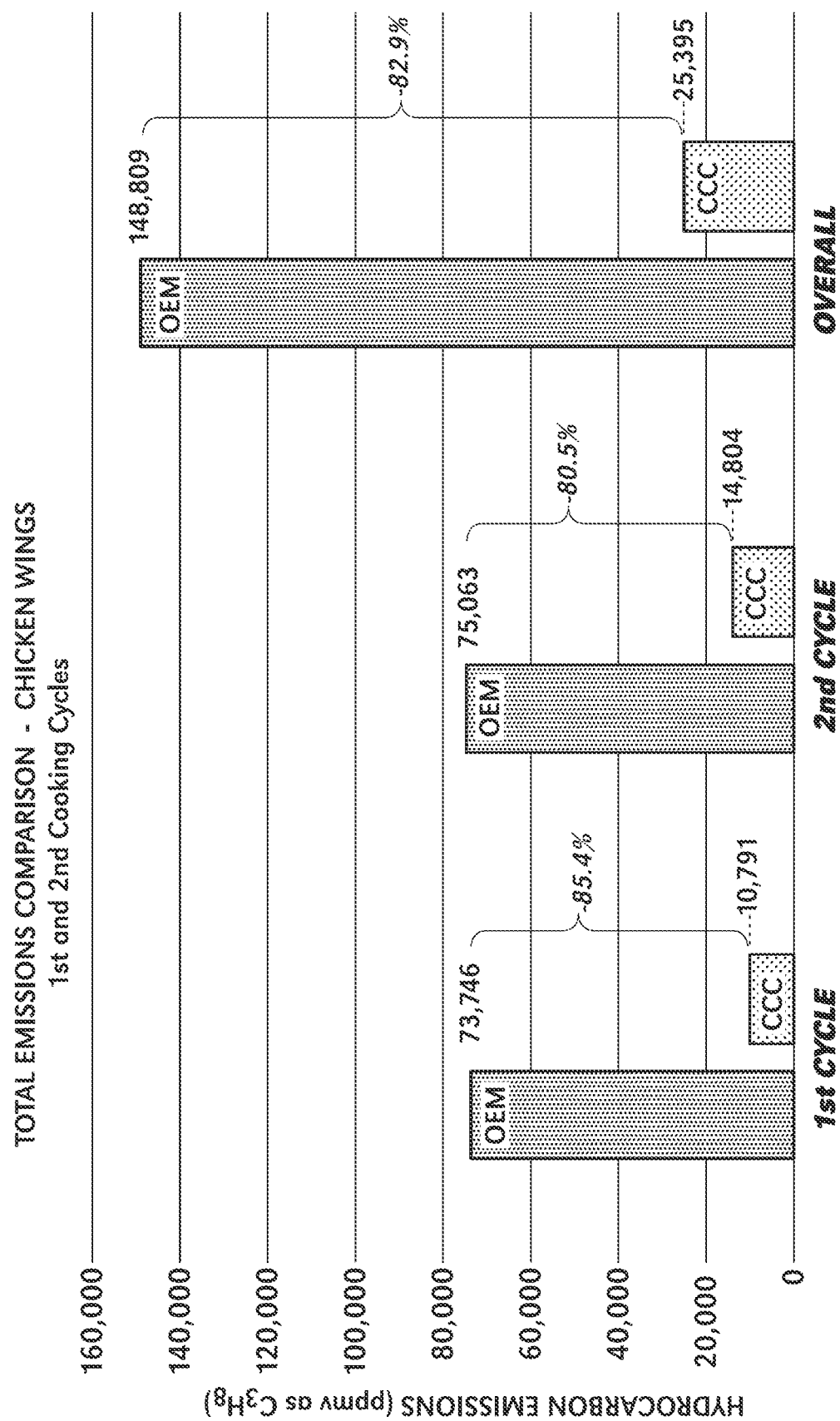
FIG. 14 is a graph comparing total emissions of the CCC Catalyst with those of the OEM Catalyst during a first and second cooking cycle of the chicken wings.

The CCC Catalyst reduced emissions by about 84% compared to the OEM catalyst. See FIG. 13. Cooking sequential trays of wings proved repeatability and showed that the catalyst of this disclosure has the capability to keep up with an high load usage condition. Even under these strenuous conditions, the CCC catalyst had a peak emissions point of 4.3 ppmv vs 33.4 ppm for the OEM catalyst Referring now to FIG. 14, as the tests consistently show, a heated screen catalyst assembly 10 of this disclosure is capable of dramatically reducing both the odorous and smoke emissions from the air frying of chicken wings; that practically zero emissions come from bacon and whole turkey cooked on the air fryer setting; and the heated catalyst screen assembly 10 significantly improves the self cleaning performance of the oven when the heater 18 is energized during the initial portion of the self-cleaning cycle.

In embodiments, the shape or geometry of the catalyst element 18 is configured or arranged for use with a predetermined oven. The catalyst element 18 may be square-shaped, rectangular-shaped, elliptical- or oval-shaped, or circular- or disc-shaped.

Although the embodiments of this disclosure have been described, it is not intended that a heated catalyst assembly for use in an oven be limited thereby, but that modifications may be made by persons of ordinary skill without departing from the scope of the following claims. The recited elements and limitations of the claims include the full range of equivalents to which they are entitled.

The invention claimed is:

1. An oven comprising:
   a cooking chamber including an air fryer mode;
   a vent in communication with the cooking chamber; and
   a heated catalyst assembly located between the cooking chamber and the vent;
   the heated catalyst assembly including:
      a housing having an inlet connected to the cooking chamber and an outlet connected to the vent; the housing containing:
         a thermal radiation heat source located within the housing between the inlet and the outlet, the thermal radiation heat source including at least one looped element;
         a first catalyst located toward, and overlapping, the inlet in proximity to one side of the thermal radiation heat source;
         a second catalyst located toward, and overlapping, the outlet in proximity to an opposite side of the thermal radiation heat source;
         the first and second catalysts arranged in planes parallel to that of the thermal radiation heat source, the thermal radiation heat source lying between the first and second catalysts, the inlet and the outlet coaxially aligned with one another.

2. The oven of claim 1, wherein, the first and second catalysts are screen catalysts including a wire mesh cloth.

3. The oven of claim 2, wherein, the wire mesh cloth of the first and second catalysts comprises two layers of wire mesh.

4. The oven of claim 2, wherein, the wire mesh cloth includes an aluminum oxide coating impregnated with at least one catalytically active element.

5. The oven of claim 4, wherein, the aluminum oxide coating comprises a mixture of two aluminum oxide phases.

6. The oven of claim 5, wherein one of the two aluminum oxide phases is a gamma phase and another of the two aluminum oxide is a boehmite phase.

7. The oven of claim 4, wherein, the at least one catalytically active element comprises platinum.

8. The oven of claim 2, wherein, the wire mesh cloth is in a range of size 10 to size 50.

9. The oven of claim 8, wherein, the wire mesh cloth is a size 30.

10. The oven of claim 1, wherein, during air frying of a food, a first concentration of volatile organic compounds enters the inlet of the heated catalyst assembly and a second concentration of volatile organic compounds exits the outlet of the heated catalyst assembly, the second concentration being lower than the first concentration and no greater than 6 ppm.

11. The oven of claim 1, wherein, the first and second catalysts include an expanded metal or metal foil substrate.

12. A method for treating emissions of an oven when air frying, the method comprising:
treating air frying emissions within a heated catalyst assembly;
wherein, the heated catalyst assembly is located between a cooking chamber of the oven and a vent in communication with the cooking chamber; and
wherein, the heated catalyst assembly includes:
a housing having an inlet connected to the cooking chamber and an outlet connected to the vent; the housing containing:
a thermal radiation heat source located within the housing between the inlet and the outlet, the thermal radiation heat source including at least one looped element;
a first catalyst located toward, and overlapping, the inlet in proximity to one side of the thermal radiation heat source;
a second catalyst located toward, and overlapping, the outlet in proximity to an opposite side of the thermal radiation heat source;
the first and second catalysts arranged in planes parallel to that of the thermal radiation heat source, the thermal radiation heat source lying between the first and second catalysts, the inlet and the outlet coaxially aligned with one another.

13. A heated catalyst assembly arranged for use in an oven having an air frying mode, wherein the oven includes a cooking chamber and a vent in communication with the cooking chamber, the heated catalyst assembly including:
a housing having an inlet connected to the cooking chamber and an outlet connected to the vent; the housing containing:
a thermal radiation heat source located within the housing between the inlet and the outlet, the thermal radiation heat source including at least one looped element;
a first catalyst located toward, and overlapping, the inlet in proximity to one side of the thermal radiation heat source;
a second catalyst located toward, and overlapping, the outlet in proximity to an opposite side of the thermal radiation heat source;
the first and second catalysts arranged in planes parallel to that of the thermal radiation heat source, the thermal radiation heat source lying between the first and second catalysts, the inlet and the outlet coaxially aligned with one another.

14. The heated catalyst assembly of claim 13, wherein, the first and second catalysts are screen catalysts including a wire mesh cloth.

15. The heated catalyst assembly of claim 14, wherein, the wire mesh cloth of the first and second catalyst comprises two layers of wire mesh.

16. The heated catalyst assembly of claim 14, wherein, the wire mesh cloth includes an aluminum oxide coating impregnated with at least one catalytically active element.

17. The heated catalyst assembly of claim 16, wherein, the aluminum oxide coating comprises a mixture of two aluminum oxide phases.

18. The heated catalyst assembly of claim 17, wherein one of the two aluminum oxide phases is a gamma phase and another of the two aluminum oxide is a boehmite phase.

19. The heated catalyst assembly of claim 16, wherein, the at least one catalytically active element comprises platinum.

20. The heated catalyst assembly of claim 14, wherein, the wire mesh cloth is in a range of size 10 to size 50.

21. The heated catalyst assembly of claim 20, wherein, the wire mesh cloth is a size 30.

22. The heated catalyst assembly of claim 13, wherein, during air frying of a food, a first concentration of volatile organic compounds enters the inlet of the heated catalyst assembly and a second concentration of volatile organic compounds exits the outlet of the heated catalyst assembly, the second concentration being lower than the first concentration and no greater than 6 ppm.

23. The heated catalyst assembly of claim 13, wherein, the first and second catalysts include an expanded metal or metal foil substrate.

24. A heated catalyst assembly arranged for use in an oven having an air frying mode, wherein the oven includes a cooking chamber and a vent in communication with the cooking chamber, the heated catalyst assembly including:
a housing having an inlet connected to the cooking chamber and an outlet connected to the vent, the inlet and outlet coaxially aligned with one another;
the housing containing:
a thermal radiation heat source located within the housing between the inlet and the outlet, the thermal radiation heat source including at least one looped element;
a first catalyst located adjacent to an inlet-facing side of the thermal radiation heat source and arranged in a plane parallel to that of the thermal radiation heat source, the first catalyst overlapping the inlet.

25. The heated catalyst assembly of claim 24, wherein the first catalyst includes an expanded metal or metal foil substrate.

26. The heated catalyst assembly of claim 24, further comprising:
a second catalyst located adjacent to an outlet-facing side of the thermal radiation heat source and arranged in a plane parallel to that of the thermal radiation heat source, the second catalyst overlapping the outlet.

27. The heated catalyst assembly of claim 26, wherein at least one of the first and second catalysts includes an expanded metal or metal foil substrate.

28. A method for treating emissions of an oven when air frying, the method comprising:
providing a heated catalyst assembly adapted for use between a cooking chamber of the oven and a vent in communication with the cooking chamber; and
wherein, the heated catalyst assembly includes:
a housing having an inlet connectable to the cooking chamber and an outlet connectable to the vent, the inlet and outlet coaxially aligned with one another;
the housing containing:
a thermal radiation heat source located within the housing between the inlet and the outlet, the thermal radiation heat source including at least one looped element;
a first catalyst located adjacent to an inlet-facing side of the thermal radiation heat source and arranged in a plane parallel to that of the thermal radiation heat source, the first catalyst overlapping the inlet.

29. The method of claim 28, further comprising passing the emissions during the air frying through the heated catalyst assembly.

30. The method of claim 28, wherein the first catalyst includes an expanded metal or metal foil substrate.

31. The method of claim 28, wherein the housing further contains:
   a second catalyst located adjacent to an outlet-facing side of the thermal radiation heat source and arranged in a plane parallel to that of the thermal radiation heat source, the second catalyst overlapping the outlet.

32. The method of claim 31, wherein at least one of the first and second catalysts includes an expanded metal or metal foil substrate.

* * * * *